United States Patent [19]

Rieper

[11] Patent Number: 5,243,032

[45] Date of Patent: Sep. 7, 1993

[54] PREPARATION OF AZO PIGMENTS WITH LOW PCB CONTENT BY COUPLING IN THE PRESENCE OF OLEFINS

[75] Inventor: Wolfgang Rieper, Frankfurt am Main, Fed. Rep. of Germany

[73] Assignee: Hoechst Aktiengesellschaft, Frankfurt am Main, Fed. Rep. of Germany

[21] Appl. No.: 781,257

[22] PCT Filed: Jun. 16, 1990

[86] PCT No.: PCT/EP90/00955

§ 371 Date: Feb. 21, 1992

§ 102(e) Date: Feb. 21, 1992

[87] PCT Pub. No.: WO90/15844

PCT Pub. Date: Dec. 27, 1990

[30] Foreign Application Priority Data

Jun. 22, 1989 [DE] Fed. Rep. of Germany ....... 3920455

[51] Int. Cl.$^5$ ..................... C09B 41/00; C09B 29/32
[52] U.S. Cl. .................... 534/581; 534/745; 534/801; 534/863
[58] Field of Search ................ 534/581, 745, 801, 863

[56] References Cited

U.S. PATENT DOCUMENTS

| | | | |
|---|---|---|---|
| 4,459,233 | 7/1984 | Fabian et al. | 540/140 |
| 5,086,168 | 2/1992 | Rieper | 534/581 X |
| 5,194,597 | 3/1993 | Rieper | 534/581 X |

FOREIGN PATENT DOCUMENTS

| | | |
|---|---|---|
| 26367/88 | 7/1991 | Austria. |
| 0063321 | 3/1987 | European Pat. Off.. |
| 0319452 | 6/1989 | European Pat. Off.. |

OTHER PUBLICATIONS

R. Anliker, *Swiss Chem.* 3 (English Edition), 25-29 (1981).

*Primary Examiner*—Robert W. Ramsuer
*Assistant Examiner*—Fiona T. Powers

[57] ABSTRACT

The production which is customary in practice of monoazo compounds based on dichloro- and tri-chloroanilines or disazo compounds of the chlorinated biphenyl series by conventional coupling methods meets with difficulties in that the resulting pigments are contaminated by traces of polychlorinated biphenyls.

According to the invention, it has now been found that by addition of water-soluble olefins of the type

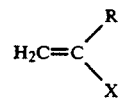

(R = H, alk or Oalk; X = —COOR$^1$, —CONHR$^2$ or —NR$^3$COR$^4$)

in the azo coupling, the side reactions which form PCBs can be decidedly suppressed during synthesis of the pigments.

11 Claims, No Drawings

PREPARATION OF AZO PIGMENTS WITH LOW PCB CONTENT BY COUPLING IN THE PRESENCE OF OLEFINS

The invention relates to the preparation of azo pigments based on chlorinated benzene-diazonium salts or biphenyl-bis-diazonium salts and acidic CH coupling components.

Industrially produced organic pigments may contain polychlorinated biphenyls (PCBs) as an impurity if certain structural conditions exist in the starting components and because of side reactions, depending on the type of synthesis process chosen [compare R. Anliker, Swiss Chem 3 (1981), No. 1-2, pages 17-23 (German) or pages 25-29 (English); and W. Herbst and K. Hunger in "Industrielle Organische Pigmente (Industrial Organic Pigments)", VCH-Verlag, Weinheim 1987, pages 577-578].

The persistence and bioaccumulative properties of relatively highly chlorinated biphenyls (containing three or more chlorine atoms) above all have meant that production of this class of compounds, which was previously widely used industrially, has been stopped and marketing of compounds and formulations which contain PCBs as impurities has even been subjected to restrictions and controls. The corresponding legal regulations have become increasingly stricter in recent years and the threshold values of amounts of polychlorinated biphenyls permitted in commercial products have been drastically reduced (in the USA, for example, to not more than 25 µg of PCB per gram of the substance marketed).

It has been found, however, that amongst the azo pigments, chiefly monoazo compounds based on di- and trichloroanilines, and also disazo pigments of the chlorinated biphenyl series may be obtained having an undesirable contamination with polychlorinated biphenyls if the pigments are prepared by conventional large-scale industrial coupling processes. The PCB contents in these azo pigments in these cases often exceed the tolerance specified in the USA.

It was thus initially obvious for the PCBs to be removed by solvent extraction from the coloring agents contaminated with them. European Patent EP-B-0,063,321 thus explains, for example, that crude organic pigments of varying chemical category can be converted into products of high purity by treatment with a mixture of a hydrophilic and a hydrophobic organic solvent at 50°-180° C., these solvents being of only limited miscibility with one another. In this technique, the impurities then collect in one of the organic phases and can be removed by the route mentioned. However, the amounts of PCBs present are often only incompletely affected by these and similar purification methods, since pigments of high specific surface area, that is to say with a high content of extremely fine particles, usually primarily bond impurities securely to their active surface by adsorption and moreover also securely hold them occlusively in agglomerates. Solvent treatment of a pigment is furthermore almost always associated with a change in the coloristic properties, so that there are narrow tolerances on the duration and intensity of an intended purification procedure. In the case of pigments of low solvent stability, purification analogously to the processes described above therefore cannot be used at all.

Another factor which makes things difficult is the fact that in all purification operations using organic solvents the impurities enriched therein, i.e., for example the polychlorinated biphenyls, must be eliminated again and subsequently destroyed, which raises considerable technical problems, particularly in the case of PCBs: Because of the exceptional resistance of the class of compounds to be removed, degradation thereof by chemical methods, thermal methods, photolysis and the like is extremely difficult [Review Article by D. Martinetz in Chem. Techn. 39 (1987)/Volume 11, pages 466-470]. The severity of these degradation methods as a rule also does not allow PCB impurities in pigments to be destroyed, if appropriate, without at the same time damaging the coloring agent.

For the reasons mentioned, it was in all cases desirable to develop synthesis processes for pigments which exclude or at least largely suppress the formation of traces of PCBs as by-products of the coupling reaction from the beginning. Thus, according to published European Patent Application EP-A-0,319,452, specific coupling conditions were to be discovered for producing monoazo pigments starting from di- and trichloroanilines as diazo components, these conditions leading to a reduction of the PCB content in the corresponding pigments to values of not more than 25 µg/g. However, the prior art known from this patent application relates exclusively to process variants in which the azo coupling is carried out in a pH range of less than 7 by addition of the diazonium salt solution to a suspension or solution of the coupling component, or by simultaneous metering of the aqueous suspensions or solutions of the two reaction components (pigment formation components) into a reaction vessel. As a characterizing feature, the procedure described therein furthermore requires limited molar excesses of diazonium salt, based on the sum of the number of moles of the coupling component present in the reaction mixture and of pigment already formed, the permitted excess of diazonium salt being made dependent on the pH range of the coupling reaction. Thus, for example, in the pH range of 4 to 7 preferred for azo couplings for the preparation of pigments, a diazonium salt excess of less than 0.05 mol % has been defined in order to obtain products with PCB contents of not more than 25 µg/g.

In contrast, if the synthesis of monoazo pigments of the di- or trichloroaniline series is carried out by a method in which the coupling component is fed into a solution of the diazonium salt which has been initially introduced into the reaction vessel (so-called "indirect" coupling), the pigment obtained can contain polychlorinated biphenyls to a degree which far exceeds the legally prescribed limit of 25 µg of PCBs per g of pigment. However, azo pigments which are prepared by a process according to which alkali is metered into the reaction mixture continuously or discontinuously in the course of the coupling operation in order to maintain a certain pH range (so-called "pendulum coupling") often contain—under certain structural conditions—PCB contents which are significantly above 25 µg/g.

It was therefore particularly desirable to have available an improved process for azo coupling in which the process limitations described above can be dispensed with and pigments having a particularly low content of PCB impurities are obtained.

The present invention thus relates to a process for the preparation of monoazo pigments of the general formula I

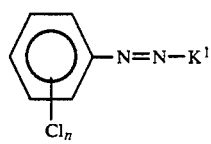  (I)

or of disazo pigments of the general formula II

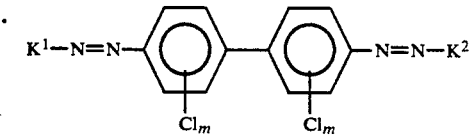  (II)

in which n is 1, 2 or 3, m is 1 or 2, $K^1$ and $K^2$ are each the radical of an acidic CH coupling component $H—K^1$ or $H—K^2$ from the acetoacetic acid arylamide or naphthol series or of a heterocyclic structure and $K^1$ and $K^2$ are identical or different, which contain not more than 25 μg of polychlorinated biphenyls having at least 4 chlorine atoms (PCBs) per gram of pigment, by azo coupling in an aqueous medium, which comprises carrying out the coupling reaction in the presence of olefins of limited or unlimited water-solubility of the general formula III

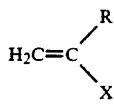  (III)

in which

R is a hydrogen atom or an alkyl or alkoxy group and

X is a radical of the formula $—COOR^1$, $—CONHR^2$ or $—NR^3COR^4$ or—if R is not alkoxy—is also the radical —CN, in which $R^1$ is hydrogen, alkyl or alkyl which is substituted by 1 or more radicals from the group comprising hydroxyl, alkoxy, amino, alkylamino and dialkylamino, $R^2$ is hydrogen, alkyl or alkyl which is substituted by 1 or more radicals from the group comprising hydroxyl, alkoxy, amino, alkylamino, dialkylamino, sulfo, carboxyl, alkoxycarbonyl and saturated or unsaturated alkanoylamino as well as corresponding N-alkanoyl-N-alkyl-amino, $R^3$ is hydrogen or alkyl and $R^4$ is alkyl.

Olefins of the formula III which are preferably employed in the context of the pigment synthesis described are those in which R is hydrogen, $C_1C_4$-alkyl or $C_1$-$C_4$-alkoxy; in particular hydrogen, methyl, methoxy or ethoxy, and the radical X has the meaning shown for this by the abovementioned groupings, in which case $R^1$ is hydrogen or $C_1$-$C_4$-alkyl which can be substituted by 1 or 2 radicals from the group comprising hydroxyl, $C_1$-$C_4$-alkoxy, amino, N-($C_1$-$C_4$-alkyl)-amino and N,N-di-($C_1$-$C_4$-alkyl)-amino; in particular hydrogen, methyl, ethyl, 2-hydroxyethyl, 3-hydroxypropyl, 2-aminoethy, 2-(dimethylamino)-ethyl, 3-aminopropyl or 3-(dimethylamino)propyl, $R^2$ is hydrogen or $C_1$-$C_4$alkyl which can be substituted by 1 to 3 radicals from the group comprising hydroxyl, $C_1$-$C_4$-alkoxy, amino, N-($C_1$-$C_4$-alkyl)-amino, N,N-di-($C_1$-$C_4$-alkyl)-amino, sulfo, carboxyl, ($CC_1$-$C_4$-alkoxy)carbonyl, N-($C_2$-$C_5$alkanoyl)-amino and N-($C_3$-$C_5$alkenoyl)-amino; in particular hydrogen, $C_1$-$C_4$-alkyl or $C_1$-$C_4$-alkyl which is substituted by 1 or 2 radicals from the group comprising hydroxyl, methoxy, ethoxy, amino, methylamino, ethylamino, N,N-dimethylamino, N,N-diethylamino, sulfo, carboxyl, acetamido and acrylamido, $R^3$ is hydrogen or $C_1$-$C_4$-alkyl, in particular hydrogen, methyl or ethyl, and $R^4$ is $C_1$-$C_4$-alkyl, in particular methyl or ethyl.

Olefinic compounds of the formula III which are particularly suitable for the process claimed are those in which the radical X is the grouping $—CONHR^2$ and R and $R^2$ have the abovementioned meanings.

The olefins to be added to the coupling mixture are readily polymerizable compounds. The water-solubility thereof should preferably be at least 1%. Such olefins of the type of compound listed which dissolve completely in water at the stated concentrations are preferred. Examples of these are, inter alia: acrylic acid, 2-methylpropenoic acid (methacrylic acid), methyl acrylate, ethyl 2-ethoxy-acrylate, 2-hydroxyethyl acrylate, 2-hydroxyethyl methacrylate, 2-hydroxypropyl methacrylate, 2-dimethylaminoethyl methacrylate, acrylamide, N-methylacrylamide, 2-methylpropenamide (methacrylamide), N-acetylacrylamide, N-hydroxymethylacrylamide, 2-acrylamido-glycolicacid,2-acrylamido-2-methylpropanesulfonic acid, (3-dimethylaminopropyl)-methacrylamide, (2-dimethylaminoethyl)-methacrylamide, (3-diethylamino-propyl)-acrylamide, N-(1-methoxymethyl-propyl)-acrylamide, 2,2-bisacrylamidoacetic acid, vinyl-acetamide, N-methyl-N-vinyl-acetamide, acrylonitrile and methacrylonitrile.

From the list of abovementioned compounds, acrylamide and methacrylamide and derivatives thereof are preferably used. The olefins of the structure III are known per se and/or can be prepared by known or customary methods.

The particular amounts of the olefins to be employed according to the invention vary between 0.01 and 1% by weight, preferably 0.05 and 0.5% by weight, based on the aqueous pigment suspension obtained after the azo coupling, or between 0.1 and 10% by weight, preferably 0.5 and 5% by weight, based on the amount of pigment formed in the reaction.

All the customary variants of azo couplings in an aqueous medium can be practised in the process according to the invention for the preparation of low-PCB mono- or disazo pigments. It is irrelevant here whether the diazonium salt solution is added to the solution or suspension of the particular coupling component in the course of the coupling or whether, for example, an alkaline solution of the coupling component is allowed to run into the diazonium salt solution or suspension; the coupling can also be carried out by simultaneously bringing together the solutions or suspensions of the two reaction partners in one reaction vessel, it being possible for static or dynamic mixers to be used in each case. The azo coupling is preferably carried out under the action of a buffer mixture, advantageously at a pH in the range from 4 to 7; however, the most favorable pH conditions for the course of the coupling reaction can also be established and maintained by metering in acid or alkali.

If appropriate, the coupling can take place in the presence of nonionic, anionic or cationic surface-active compounds or other types of auxiliary, such as naturally occurring or synthetic resins or resin derivatives or additives for printing inks, lacquers or plastics.

The aqueous pigment suspensions obtained in the coupling operation are as a rule filtered immediately after synthesis and the pigments are washed free from salt. The resulting aqueous press-cake is then either used directly for pigmenting or first processed to give a powder after drying.

The process according to the invention is particularly suitable for lowering the PCB content of those monoazo pigments which are produced by coupling processes practised on a large industrial scale using chlorinated anilines as diazo components. Examples of such possible diazo components are: 2-chloroaniline, 3-chloroaniline, 4-chloroaniline, 2,3-dichloroaniline, 2,4-dichloroaniline, 2,5-dichloroaniline, 2,6-dichloroaniline, 3,4-dichloroaniline, 3,5-dichloroaniline, 2,3,4-trichloroaniline, 2,3,5-trichloroaniline, 2,3,6-trichloroaniline, 2,4,5-trichloroaniline, 2,4,6-trichloroaniline and 3,4,5-trichloroaniline, 2,4-dichloroaniline, 2,5-dichloroaniline and 2,4,5-trichloroaniline being preferred diazo components.

The process according to the invention is furthermore suitable for the preparation of low-PCB disazo pigments starting from chlorinated diaminobiphenyls. Examples which may be mentioned of these bifunctional diazo components are: 2,2'-dichloro-4,4'-diamino-biphenyl, 3,3'-dichloro-4,4'- diamino-biphenyl, 2,2',3,3'-tetrachloro-4,4'-diaminobiphenyl, 2,2',5,5'-tetrachloro-4,4'-diamino-biphenyl and 2,2',6,6'-tetrachloro-4,4'-diamino-biphenyl, 3,3'-di-chloro-4,4'-diamino-biphenyl and 2,2',5,5'-tetrachloro-4,4'-diamino-biphenyl being preferred bis-diazo components.

Acidic CH coupling components which are of particular interest for the synthesis of mono- or disazo pigments by the process according to the invention are acetoacetic acid arylamides, such as, for example, acetoacetic acid anilide, which can be substituted on the phenyl ring by one or more, preferably 1 to 3, of the radicals from the group comprising methyl, methoxy, ethoxy, nitro and chlorine and/or can contain a fused-on 5- or 6-membered heterocyclic radical on the phenyl ring, preferably benzimidazolone; as well as naphthol or naphthol derivatives, such as 2-hydroxy-3-naphthoic acid and 2-hydroxy-3-naphthoic acid N-arylamides, for example 2-hydroxy-3-naphthoic acid N-phenyl-amide, which can be substituted on the phenyl ring by one or more of the radicals from the group comprising methyl, methoxy, ethoxy, nitro, alkanoylamino, such as acetamino, aroylamino, such as benzoylamino, and chlorine and/or can contain a fused-on 5- or 6-membered heterocyclic radical on the phenyl ring, preferably benzimidazolone; and furthermore all acidic CH com-pounds in which the activated hydrogen atom is bonded to a mono- or polynuclear heterocyclic radical, such as, for example, 1-aryl-pyrazol-5-one, which can be substituted in the 3-position by methyl, carbalkoxy or acylamino, or such as barbituric acid, 2,6-dihydroxypyridine, 2,4-di-hydroxyquinoline, 1,5-diazabicyclo[3,3,0]-octane-2,4,6,8-tetrone, 2H-pyrazolo[3,4-b]pyridine-3,6-dione, 1,2,3,5-tetrahydro-imidazo[1,2-b]isoquinolin-5-one, 9H-pyrazolo[5,1-b]quinazolin-9-one or 2,4-dihydroxy-pyrimido[1,2a]-benzimidazole, to name only a few representatives from the series of heterocyclic coupling components.

Examples of selected coupling components for the synthesis of monoazo pigments by the process according to the invention are: 2-hydroxy-3-naphthoic acid N-arylamides, such as 2- hydroxy-3-naphthoic acid anilide, 2-hydroxy-3-naphthoic acid N-(2- or 4-methylphenyl)-amide, 2-hydroxy-3-naphthoic acid N-(2-methoxy- or 2-ethoxyphenyl)-amide, 2-hydroxy-3-naphthoic acid N-(2,5-dimethoxyphenyl)-amide and 5-(2-hydroxy-3-naphthoylamino)-benzimidazol-2-one.

Coupling components which are preferably used in the synthesis of disazo pigments are: acetoacetanilides, which can be substituted on the phenyl nucleus by 1 to 3 of the radicals from the group comprising methyl, methoxy, ethoxy, nitro and chlorine, as well as 5-acetoacetylbenzimidazolones.

The azo pigments prepared by the process according to the invention can be used for coloring naturally occurring and synthetic materials. They are particularly suitable for pigmenting printing inks for letterpress/offset printing, gravure printing, flexographic printing and other specific printing processes, for the preparation of pigmented lacquers based on systems which dry by oxidation or oven-drying systems, for the preparation of emulsion paints, for pigmenting plastics, such as, for example, polyvinyl chloride, polyolefins, polystyrenes and copolymers thereof, poly(methyl methacrylates), polyurethanes, polycarbonates, polyesters, cellulose derivatives, elastomers or thermosets, and as coloring agents for spin-dyeing. The pigments obtainable according to the invention can also be employed for specific fields of application, for example as coloring agents for electrophotographic toners, for color jet printing processes (for example ink jet processes) or for heat transfer tapes.

In the following examples parts and percentage data relate to the weight, unless indicated otherwise. Parts by volume bear the same relationship to parts by weight as the liter to the kilogram.

EXAMPLE 1

16.3 parts of 2,5-dichloroaniline are stirred in 37 parts by volume of 30% strength hydrochloric acid for about 8 hours until formation of the amine hydrochloride is complete. After cooling, by addition of ice, the amine is then diazotized at $-5°$ to $0°$ C. by feeding in 14 parts by volume of a 40% strength aqueous sodium nitrite solution. After stirring for a further hour, the mixture is diluted to 400 parts by volume by making up with water, the nitrite excess present is destroyed by means of sulfamic acid, kieselguhr is added as a filtration auxiliary and the resulting diazonium salt solution is filtered. 1.2 parts of acrylamide are now introduced into this solution and the diazo component thus prepared is buffered to a pH of 4 to 4.5 with a buffer mixture prepared from 45 parts of 33% strength sodium hydroxide solution and 35 parts of glacial acetic acid.

32.5 parts of 5-(2-hydroxy-3-naphthoylamino)-benzimidaz-ol-2-one are stirred into 300 parts by volume of water and dissolved by addition of 30 parts of 33% strength sodium hydroxide solution at 30°-35° C. in a second vessel. The coupling component solution obtained in the above manner is now added dropwise to the initially prepared buffered diazonium salt solution at 0°-10° C. in the course of one hour, while stirring, the pH of the reaction mixture gradually rising to 5 to 5.5. When the feeding-in of the coupling component has ended and as soon as diazonium ions are no longer detectable by spot tests with H-acid, the suspension is briefly heated to 95° C. and the azo pigment which has precipitated is then filtered off, washed salt-free with water and dried at 60° C.

For analytical determination of the content of polychlorinated biphenyls, a powder sample of the coupling product thus obtained, C.I. Pigment Brown 25 - No. 12510 (CAS No. 6992-11-6), is first doped with a standard solution of two known chlorinated biphenyls and dissolved in approximately 96% strength sulfuric acid, and the resulting solution is mixed, in the combined extraction/purification process described below, with silica gel in an amount such that this still remains free-flowing. This mixture (of adsorbent together with test substance) is now transferred into a customary chromatography tube which has already been charged beforehand with two silica gel purification zones (a silica gel layer laden with KOH over a silica gel layer laden with oleum) and is subsequently eluted with n-hexane. The polychlorinated biphenyls in the eluate are determined quantitatively, after separation by gas chromatography on a capillary column, by electron capture detection (=ECD) or massselective detection against an internal PCB standard. The proportions of PCBs determined in this way were 20 µg per g of pigment (20 ppm of PCBs).

The sample can also be quantified by other analytical methods, for example by high pressure liquid chromatography (HPLC).

EXAMPLE 2

16.3 parts of 2,5-dichloroaniline are diazotized as described in Example 1. After filtration, 4 parts of an approximately 50% strength aqueous solution of methylolacrylamide (N-hydroxymethyl-acrylamide) are added and the hydrochloric acid diazonium salt solution prepared is buffered at pH =4. Coupling is again carried out by feeding an alkaline solution of 32.5 parts of 5-(2-hydroxy-3-naphthoylamino)-benzimidazol-2-one at 0°-8° C. into the diazo component initially prepared and has ended when a pH range of not more than 5.0 to 5.2 is reached in the reaction mixture. The coloring agent obtained after working up and drying, C.I. Pigment Brown 25 (No. 12510) has an analytically determined PCB content of 25 µg/g (25 ppm).

EXAMPLE 3

Comparison Test

If the process described in Example 1 is carried out by indirect coupling but without using an olefin having the structure according to formula III, the coupling product isolated in this manner, Pigment Brown 25 (No. 12510), then contains about 150 µg/g of polychlorinated biphenyls (150 ppm of PCBs).

EXAMPLE 4

40.0 parts of finely crystalline 2,4,5-trichloroaniline are stirred overnight in a mixture of 200 parts of water, 200 parts by volume of 30% strength hydrochloric acid and 0.5 part of a secondary alkanesulfonate (chain length in the alkyl radical 60% $C_{13}$-$C_{15}$ and 40% $C_{16}$-$C_{17}$). After addition of ice to the hydrochloride suspension formed, the amine is diazotized by rapidly feeding in 29 parts by volume of a 40% strength aqueous sodium nitrite solution, and the mixture is subsequently stirred with a nitrite excess for 1 hour. The excess nitrite ions present therein are then destroyed by means of sulfamic acid, the diazonium salt solution is clarified and 5 parts of methacrylamide are added. 64.5 parts of 2-hydroxy-3-naphthoic acid N-(4-ethoxyphenyl)-amide are dissolved at 80°-85° C. in 400 parts of water, to which 28 parts by volume of 33% strength sodium hydroxide solution have first been added, in a coupling vessel. The clear solution thus obtained is cooled to 5°-10° C. by introduction of ice, after addition of 15 parts by volume of a 10% strength aqueous solution of the abovementioned alkanesulfonate, and 25 parts by volume of glacial acetic acid are added, while stirring, the coupling component precipitating in finely divided form.

Coupling is now carried out at 15°-25° C. by dropwise addition of the above diazonium salt solution to the initially prepared suspension of the 2-hydroxy-3-naphthoic acid arylide in the course of 2 hours, the pH of the reaction mixture being kept in the range from pH 4.5 to 4 by dropwise addition of 10% strength sodium hydroxide solution. The violet-brown coupling product 3-hydroxy-N-(4-ethoxyphenyl)-4-(2,4,5-trichlorophenyl)azo-2-naphthalene-carboxamide (CAS No. 5012-29-3) obtained when coupling is complete and isolated in the customary manner has an analytically determined PCB content of 18 µg/g (18 ppm).

EXAMPLE 5

Comparison Test

If the azo pigment described in Example 4 is again synthesized by the process corresponding to so-called pendulum coupling but no methacrylamide has been added to the diazonium salt solution here, the coupling product obtained contains more than 50 µg/g of hexachlorobiphenyls (more than 50 ppm of PCBs).

EXAMPLE 6

32.2 parts of 2,2',5,5'-tetrachloro-4,4'-diamino-biphenyl are stirred for 8 hours in a mixture of 85 parts by volume of water and 85 parts by volume of 30% strength hydrochloric acid. The diamine hydrochloride formed in this way is then diazotized at 0°-10° C. by dropwise addition of 28 parts by volume of a 40% strength aqueous sodium nitrite solution. When the diazotization is complete, the resulting bisdiazonium salt solution is diluted to 400 parts by volume by making up with water and filtered, with addition of silica gel, and any excess of nitrous acid present in the filtrate is destroyed by means of sulfamic acid.

47 parts of acetoacetic acid 2-methyl-4-chloro-anilide are stirred in 400 parts by volume of water in a second vessel and dissolved by adding 20 parts by volume of 33% strength sodium hydroxide solution. The resulting clear solution is now cooled to 10° C., 1 part of the alkanesulfonate described in Example 4 is added and the coupling component is then precipitated, while stirring, by addition of 14 parts by volume of glacial acetic acid in which 1 part of dimethyl-diallyl-ammonium chloride and 3 parts of 2-hydroxyethyl methacrylate are dissolved.

The coupling itself is carried out by dropwise metering of the above bisdiazonium salt solution, at 15°-20° C. in the course of 2 hours, into the coupling suspension initially prepared. As soon as the pH of the reaction mixture has fallen from initially 5.5 to pH 4 to 3.5, feeding in of 6% strength sodium hydroxide solution is started in order to keep the pH range between 4 and 3.5 during this reaction phase. When the coupling has ended, the suspension is heated to 95° C and is subsequently stirred at the elevated temperature for a further hour, and the pigment which has precipitated is filtered off, washed salt-free with water and dried.

The coupling product thus obtained, C.I. Pigment Yellow 113 - No. 21126 (CAS No. 14359-20-7) has a tetrachlorobiphenyl content of 22 μg/g (22 ppm).

EXAMPLE 7

32.2 parts of 2,2', 5,5'-tetrachloro-4,4'-diamino-biphenyl are diazotized as described in Example 6. 3 parts of 2,2-bisacrylamidoacetic acid, dissolved in 20 parts by volume of water, are then added to the bisdiazonium salt solution obtained after filtration.

Meanwhile, a solution of 42 parts of acetoacetic acid 2,4-dimethyl-anilide in a mixture of 800 parts by volume of water and 20 parts by volume of 33% strength sodium hydroxide solution has been prepared in a separate dissolving vessel.

For the coupling, the solutions of the two reaction components made up to equal volumes are metered simultaneously, while stirring, into an acetic acid/sodium acetate buffer mixture which has been initially prepared and to which 2 parts of a condensation product of stearyl alcohol and 18 equivalents of ethylene oxide have been added. During this procedure, the pH in the coupling vessel varies between pH 5.5 and 4.5.

A content of polychlorinated biphenyls of 23 μg/g in total (23 ppm of PCBs) is determined analytically in the disazo compound C.I. Pigment Yellow 81 - No. 21127 (CAS No. 22094-93-5) isolated in the customary manner after coupling.

EXAMPLE 8

Comparison Test

If the coupling described in Example 7 to give C.I. Pigment Yellow 81 (No. 21127) is carried out, in contrast, in the absence of the acrylamide derivative used in that example, the resulting coupling product has a PCB content of 70 μg/g (70 ppm).

I claim:

1. A process for the preparation of a monoazo pigment of the formula (I)

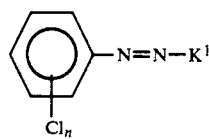

or of a disazo pigment of the formula II

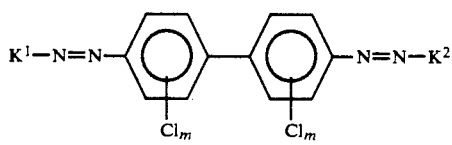

in which n is 1, 2 or 3, m is 1 or 2, $K^1$ and $K^2$ are each the radical of an acidic CH coupling component H—$K^1$ or H—$K^2$ from the acetoacetic acid arylamide or naphthol series or of a heterocyclic structure and $K^1$ and $K^2$ are identical or different, which contains not more than 25 μg of polychlorinated biphenyls (PCBs) per gram of pigment, by azo coupling in an aqueous medium, which comprises carrying out the coupling reaction in the presence of olefins of limited or unlimited water-solubility of the formula III

in which

R is a hydrogen atom or an alkyl or alkoxy group and
X is a radical of the formula —$COOR^1$, —$CONHR^2$ or —$NR^3COR^4$ or—if R is not alkoxy—is also the radical —CN, in which $R^1$ is hydrogen, alkyl or alkyl which is substituted by 1 or more radicals from the group comprising hydroxyl, alkoxy, amino, alkylamino and dialkylamino, $R^2$ is hydrogen, alkyl or alkyl which is substituted by 1 or more radicals from the group comprising hydroxyl, alkoxy, amino, alkylamino, dialkylamino, sulfo, carboxyl, alkoxycarbonyl and saturated or unsaturated alkanoylamino as well as corresponding N-alkanoyl-N-alkyl-amino, $R^3$ is hydrogen or alkyl and
$R^4$ is alkyl.

2. The process as claimed in claim 1, wherein, in the olefins of the formula III, R is hydrogen, $C_1$–$C_4$-alkyl or $C_1$–$C_4$-alkoxy, and the radical X has the meaning shown for this in claim 1 by the groupings mentioned therein, in which case $R^1$ is hydrogen or $C_1$–$C_4$-alkyl which can be substituted by 1 or 2 radicals from the group comprising hydroxyl, $C_1$–$C_4$-alkoxy, amino, N-($C_1$–$C_4$-alkyl)-amino and N,N-di-($C_1$–$C_4$-alkyl)-amino;

$R^2$ is hydrogen or $C_1$–$C_4$-alkyl which can be substituted by 1 to 3 radicals from the group comprising hydroxyl, $C_1$–$C_4$-alkoxy, amino, N-($C_1$–$C_4$-alkyl)-amino, N,N-di-($C_1$–$C_4$-alkyl-amino, sulfo, carboxyl, ($C_3$–$C_5$-alkoxy)-carbonyl, N-($C_2$–$C_5$-alkanoyl)-amino and N-)$C_3$–$C_5$-alkenoyl)-amino;

$R^3$ is hydrogen or $C_1$–$C_4$-alkyl, and
$R^4$ is $C_1$–$C_4$-alkyl.

3. The process as claimed in claim 1 or 2, wherein, in the olefins of the formula III, R is hydrogen, methyl, methoxy or ethoxy, and the radical X has the meaning shown for this in claim 1 by the grouping mentioned therein, in which case $R^1$ is hydrogen, methyl, ethyl, 2-hydroxyethyl, 3-hydroxypropyl, 2-aminoethyl, 2-(dimethylamino)ethyl, 3-aminopropyl or 3-(dimethylamino)-propyl, $R^2$ is hydrogen, $C_1$–$C_4$-alkyl or $C_1$–$C_4$-alkyl which is substituted by 1 or 2 radicals from the group comprising hydroxyl, methoxy, ethoxy, amino, methylamino, ethylamino, N,N-dimethylamino, N,N-diethylamino, sulfo, carboxyl, acetamido and acrylamido, $R^3$ is hydrogen, methyl or ethyl and
$R^4$ is methyl or ethyl.

4. The process as claimed in claim 1 wherein, in the olefins of the formula III, the radical X is the grouping —$CONHR^2$.

5. The process as claimed in claim 1 wherein the olefins of the formula III are employed in an amount of 0.01 to 1% by weight, based on the aqueous pigment suspension obtained after the azo coupling.

6. The process as claimed in claim 5, wherein the amount of olefins employed is 0.05 to 0.5% by weight.

7. The process as claimed in claim 1 wherein the olefins of the formula III are employed in an amount of 0.1 to 10% by weight, based on the amount of pigment formed in the coupling.

8. The process as claimed in claim 7, wherein the amount of olefins employed is 0.5 to 5%.

9. The process as claimed in claim 1 wherein the azo coupling is carried out under the action of a buffer mixture at a pH in the range from 4 to 7.

10. A pigmenting printing ink, a lacquer, an emulsion paint, a plastic, an electrophotographic toner, an ink jet ink, or a heat transfer tape, which is colored, wherein the coloring agent comprises an azo pigment prepared by the process of claim 1.

11. A method for coloring a pigmenting printing ink, a lacquer, an emulsion paint, a plastic, an electrophotographic toner, an ink jet ink, or a heat transfer tape, comprising the step of incorporating an azo pigment prepared by the process of claim 1.

* * * * *

UNITED STATES PATENT AND TRADEMARK OFFICE
CERTIFICATE OF CORRECTION

PATENT NO. : 5,243,032
DATED : September 7, 1993
INVENTOR(S) : Wolfgang Rieper It is certified that error appears in the above-identified patent and that said Letters Patent is hereby corrected as shown below:

Col. 3, line 65 "2-aminoethy" should read --2-aminoethyl--.

Col. 4, line 3 "(CC$_1$-C$_4$-alkoxy) carbonyl" should read --(C$_1$-C$_4$-alkoxy) carbonyl--.

In claim 2 at col. 10, line 40, in the definition of R$^2$, "N, N-di-(C$_1$-C$_4$-alkyl-amino" should read --N, N-di-(C$_1$-C$_4$-alkyl)-amino--.

In claim 2, at Col. 10, line 41, in the definition of R$^2$, "(C$_3$-C$_5$-alkoxy)-carbonyl" should read --(C$_1$-C$_4$-alkoxy)-carbonyl--.

In claim 2 at Col. 10, line 42 in the definition of R$^2$, "N-)C$_3$-C$_5$-alkenoyl)-amino" should read --N-(C$_3$-C$_5$-alkenoyl)-amino--.

In claim 3 at col. 10, line 45 delete "or 2".

Signed and Sealed this

Seventeenth Day of May, 1994

BRUCE LEHMAN

*Attest:*

*Attesting Officer*     *Commissioner of Patents and Trademarks*